US012777342B1

(12) United States Patent
Kondareddy et al.

(10) Patent No.: US 12,777,342 B1
(45) Date of Patent: Oct. 27, 2026

(54) DYNAMIC BAND STEERING FOR WIRELESS MESH NETWORKS

(71) Applicant: Amazon Technologies, Inc., Seattle, WA (US)

(72) Inventors: Yogesh Reddy Kondareddy, San Jose, CA (US); Wahida Nasrin, Santa Clara, CA (US); Wen-Chieh Feng, Taipei City (TW); Kyoungchae Oh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 18/620,706

(22) Filed: Mar. 28, 2024

Related U.S. Application Data

(60) Provisional application No. 63/548,790, filed on Feb. 1, 2024.

(51) Int. Cl.
*H04W 16/28* (2009.01)
*H04W 72/0453* (2023.01)
*H04W 76/11* (2018.01)

(52) U.S. Cl.
CPC ....... *H04W 16/28* (2013.01); *H04W 72/0453* (2013.01); *H04W 76/11* (2018.02)

(58) Field of Classification Search
CPC ....... H04W 16/28; H04W 8/18; H04W 48/16; H04W 52/0216; H04W 52/0219; H04W 8/005; H04W 36/00837; H04W 36/14; H04W 4/02; H04W 4/029; H04W 40/023; H04W 40/246; H04W 40/248; H04W 40/26; H04W 40/28; H04W 40/32; H04W 48/14; H04W 48/18; H04W 48/20; H04W 76/00; H04W 76/18; H04W 8/183; H04W 88/16
USPC ....... 370/329, 331, 335, 256, 311, 315, 235, 370/252, 254, 338; 375/E7.022
See application file for complete search history.

(56) References Cited

U.S. PATENT DOCUMENTS 8,396,047 B2 * 3/2013 Krishnamurthy ..... H04L 5/0053 370/344
11,539,496 B2 * 12/2022 Shen .................. H04L 27/2607
2019/0178980 A1 * 6/2019 Zhang .................. A61B 5/7267
2019/0327124 A1 * 10/2019 Lai .......................... G01S 5/017
2020/0322868 A1 * 10/2020 Claffey ................... H04L 12/44
2021/0076386 A1 * 3/2021 Liu ...................... H04B 7/0617
2022/0303167 A1 * 9/2022 Wang .................... H04W 72/21

(Continued)

*Primary Examiner* — Joseph Arevalo
(74) *Attorney, Agent, or Firm* — K&L Gates LLP

(57) ABSTRACT

Techniques are generally described for dynamic band steering for wireless mesh networks. An example method includes receiving a request from a client device to connect to a wireless network, wherein connecting to the wireless network includes a band steering process and determining that the client device is present in a database of client devices. The example method further includes determining that the request from the client device was received within a pre-determined window of time, wherein the window of time is based on a timestamp of a last known activity of the client device and disabling, based on determining that the client device is present in the database and determining that the request was received within the pre-determined window of time, the band steering process. The example method also includes executing a wireless network connection routine based on the request.

20 Claims, 5 Drawing Sheets

100

(56) References Cited

U.S. PATENT DOCUMENTS

| | | | | |
|---|---|---|---|---|
| 2023/0034639 | A1 * | 2/2023 | Sakhnini | H04W 72/23 |
| 2023/0039436 | A1 * | 2/2023 | Bai | H04L 5/0023 |
| 2023/0105317 | A1 * | 4/2023 | Jayawardene | H04W 12/06 370/329 |
| 2023/0269762 | A1 * | 8/2023 | He | H04L 5/0044 370/329 |
| 2025/0071597 | A1 * | 2/2025 | Lei | H04W 72/51 |

* cited by examiner

DYNAMIC BAND STEERING FOR WIRELESS MESH NETWORKS

CROSS-REFERENCE TO RELATED APPLICATIONS

This application claims the benefit of U.S. Provisional Patent Application No. 63/548,790, filed Feb. 1, 2024, the disclosure of which is incorporated herein by reference in its entirety.

BACKGROUND

For wireless networks with multiple frequency bands, it may be desirable to steer client devices to a particular frequency band. For example, certain bands may offer a higher quality of service, or may be less congested than other bands. Band steering in mesh networks may present technical challenges, e.g. when roaming between access points.

DETAILED DESCRIPTION

Figure 1:
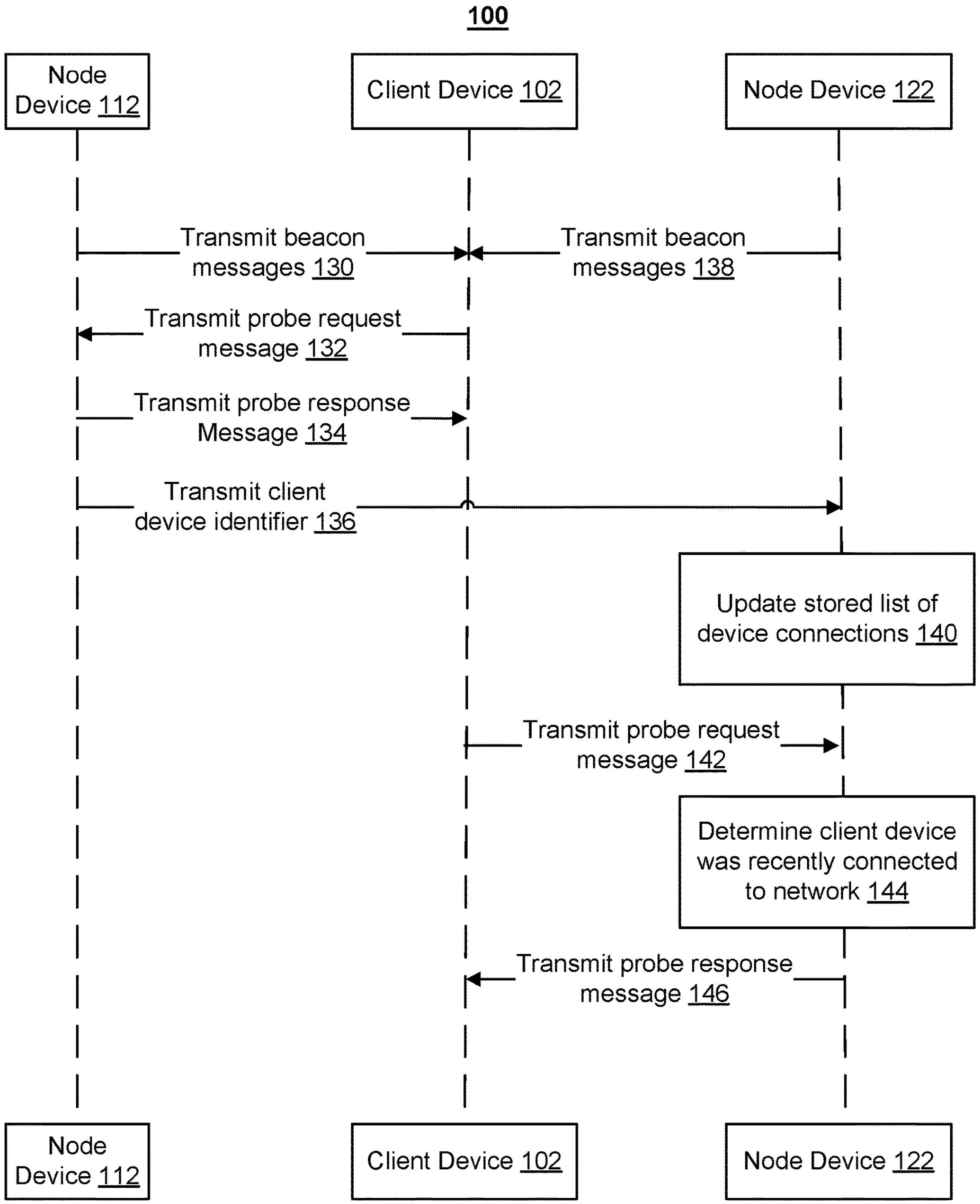
FIG. 1 depicts interactions among example systems for dynamic band steering for wireless mesh networks, in accordance with various aspects of the present disclosure.

Band steering may be utilized in networks where it is desirable to steer client devices from one frequency band to another. For example, client devices may be steered from a first frequency band to a frequency band with lower power utilization, or to a frequency band with less network congestion.

In the context of mesh networks, mobile client devices may often roam between different network nodes. In various examples, it may be desirable for wireless access points of a mesh network to steer client devices to connect to a 5 GHz band rather than a 2.4 GHz band, even though the client device itself must decide which frequency band to connect to. If a client device continues to attempt to connect to the 2.4 GHz band and refuses to connect to the 5 GHz band, band steering may cause a significant connection delay, on the order of seconds, which may negatively impact the user experience. In instances in which network access points may be configured, but an administrator is unable to configure each and every client device on the network, a solution must be found to avoid this negative user experience without reconfiguring the individual client devices.

One previous approach has been to disable band steering to avoid the types of delays for client devices refusing band steering mentioned previously. While this approach can eliminate any interruption in service for client devices that refuse band steering, it also relinquishes the benefits that band steering can provide (e.g., connection optimization). Accordingly, various examples disclosed herein are presented to enable dynamic band steering for wireless mesh networks while also avoiding the interruption of service for certain roaming client devices described previously. By addressing the various scenarios and client device configurations that cause service interruptions when band steering is enabled, various examples disclosed herein achieve the benefits of band steering while still avoiding connection delay historically caused by band steering.

Various examples disclosed herein present solutions to enable band steering by steering client devices only during initial connections and not during roaming. Various examples enable networks to be more assertive in directing client devices to desired frequency bands (e.g., 5 GHZ) without negatively impacting the client roaming experience.

To achieve band steering without negatively impacting the client roaming experience, network nodes may be made aware of a client device's current connection status. In various examples, each node in the network may already maintain a list of connected client devices and their respective associated nodes. Various examples expose this list of connected client devices to network software tools (e.g., hostapd).

In order to expose the list of connected client devices to network software tools, various examples may create a configurable database of network-client in the network software tool (e.g., hostapd) that maintains a list of client devices, the basic service set identifier (BSSID) where each client device is connected, connection status (e.g., connected or disconnected) and the list update time.

Various examples may further implement an extended set of commands within the network software tool (e.g., hostapd) that allow adding entries to the list, reading the list, and deleting entries from the list. Example command names include "set_network_client" to add an entry to the list, "show_network_client" to show the list, and "remove_network_client" to delete an entry from the list.

Various examples may further update the network-client database throughout the network whenever a client device connects and disconnects using the network infrastructure. If there is an old entry for the client device, it may be removed from the list every time the client device connects or disconnects before adding the new entry.

Various examples may further, upon receiving a probe or authentication request from a client device, first check the network-client database to see if the client device is roaming from another node or connecting back within a short period of time (e.g., five seconds). Based on the network-client database entry, the node may decide to steer the client device if it is connecting to the network for the first time, not roaming from another node, or connecting back after passage of the defined short period of time.

In certain instances, client devices may experience disconnections due to limited network coverage and may quickly attempt to reconnect. For example, high unpredicted path loss in an indoor environment may result in poor network coverage in certain areas. Active client devices moving into poor network coverage zones may experience disconnects and attempt to quickly reconnect. In these instances, network steering may add some delay during the reconnection. Various examples disclosed herein consider these cases and address them by allowing these client devices to quickly reconnect, allowing them to connect to a band (e.g., 2.4 GHz) without steering.

FIG. 1 depicts interactions among example systems for dynamic band steering for wireless mesh networks. The system 100 includes several devices, which are described in further detail in FIG. 2, indicating interactions among the various devices of system 100. Devices are indicated as rectangular boxes at the top and bottom of the figure, with vertical dashed lines indicating the device through varying points in time. Interactions between devices are indicated as horizontal lines connecting two devices at a point in time, and operations involving a single device are indicated as rectangular boxes connected to a single device at a point in time.

The system 100 may include devices such as a client device 102, a node device 112, and/or a node device 122. It will be understood that the configuration shown for system 100 in FIG. 1 is one illustrative example, and other configurations may be possible for system 100 including more or fewer devices, different types of devices, and/or different ordering or types of operations and interactions among the devices. The client device 102, node device 112, and/or node device 122 may belong to and/or connect to a wireless network, such as a wireless mesh network or other communications network. Further details of the client device 102, node device 112, and/or node device 122 are given below in connection with FIG. 2, with further detail regarding the wireless network.

As shown by operation 130 and operation 138, node device 112 and/or node device 122 may transmit beacon messages to client device 102 and/or any other client or other device capable of wireless communication in range of one or more node devices. The beacon messages may comprise a first message for a first frequency band and a second message for a second frequency band. The first message for the first frequency band may be broadcast using a first antenna coupled to a first radio device. The second message for the second frequency band may be broadcast using a second antenna coupled to a second radio device. The beacon message may be transmitted to include data representing properties of the wireless network, node device 112, and/or node device 122. The beacon message may indicate, for example, a name of the wireless network (e.g., a service set identifier, SSID) and/or other parameters for the wireless network and/or wireless mesh network. The beacon message may be structured according to various wireless communications standards, such as 802.11 technical standards.

As shown by operation 132, in various examples, the client device 102 may transmit a probe request to discover access points in proximity to the client device 102. The probe request may indicate supported wireless communication capabilities and/or other properties of the client device 102. In response, the node device 112, as shown by operation 134, may transmit one or more probe response messages. The probe response message may include data that communicates various properties of the wireless network, node device 112, and/or node device 122. For example, the probe response message may indicate the network name, supported data rates, encryption types, other capabilities of the wireless network, node device 112, and/or node device 122, and/or the like.

In various examples, the client device 102 and/or node device 112 may exchange an authentication request and/or authentication response as part of an authentication sequence. For example, the client device 102 may transmit an authentication request to node device 112 and/or node device 122, which may cause node device 112 and/or node device 122 to transmit the authentication response. In various examples, the authentication sequence may include or be followed by an association request and/or response. Transmitted messages may, additionally or alternatively, include higher level authentication and/or other handshake protocols for establishing an authenticated connection from the client device 102 to the wireless network, node device 112, and/or node device 122.

As shown by operation 136, node device 112 may transmit a client device identifier to node device 122. In various examples, the node device 112 may maintain a database of client device identifiers and may update the database with the identifier of client device 102. The database may also include timestamps indicating the time of various interactions with nodes of the wireless network. The database may be referred to as "network_client" database, and may include a connection status for each client, an identifier of the network node to which the client device is currently and/or most recently connected, a BSSID of the client device, and/or an update time for the latest update to the database. In various examples, a command line interface may be used to access entries in the database of client information. For example, a request and response to the request for viewing an entry in the database may be "#hostapd_cli.1-i ap_tt0 SHOW_NETWORK_CLIENT bssid=9c:a5:70:02:a2:40sta=14:2d:4d:b7:5e:f9 is_connected=1 time=701".

As shown by operation 140, node device 122 may update the stored list of device connections, such as the database of client identifiers or "network_client" database described previously. The node device 122 may update the list of device connections upon receiving the client device identifier transmitted by another network node device such as node device 112. In various examples, the node device 122 may rewrite the stored list of device connections or update the existing list of device connections using the new information received from node device 112. In various examples, the node device 122 may use timestamps of entries in the database of client identifiers to update each entry to use the latest available information from available network nodes. For example, the node device 122 may have an entry for client device 102 with "status-0" to indicate that client device 102 is disconnected. Upon connecting with client device 102, node device 112 may update or create a new entry with "status=1" for client device 102 and transmit the updated information regarding client device 102 to node device 122, which may in turn update its entry from "status-0" to "status=1" for client device 102.

As shown by operation 142, client device 102 may transmit a probe request message to node device 122. The client device 102 may transmit first data indicating an identifier of the client device 102 connected to the wireless mesh network via the node device 112. In various examples, the client device 102 may roam between nodes of the wireless network and may seek to connect to node device 122 after connecting to node device 112. Transmitting the probe request message to node device 122 may proceed in the same manner as described previously in connection with operation 132, the probe request message may be transmitted in response to and/or based on the beacon message transmitted in operation 138.

As shown in operation 144, the node device 122 may refer to the updated list of device connections to determine that client device 102 was recently connected to the network. Node device 122 may, upon receiving the probe request, query the list of device connections, database of client identifiers, and/or "network_client" database described previously. The query of the database may be constructed based on a unique identifier of the client device 102. The node device 122 may refer to the timestamp of the last known update to the database relevant to client device 102 to determine the timeframe when the client device 102 was last connected. For example, the node device 122 and/or other node devices of the wireless network may be configured with a particular window of time, and the node device 122 may use the time window, the current time, and the timestamp associated with client device 102 to determine whether the client device 102 was recently connected. If identifier of client device 102 does not have any corresponding entry in the database of clients, the node device 122 may be unable to retrieve a timestamp, and therefore may infer that the client device 102 was not recently connected.

The node device 122 may, in addition to or alternatively to determining if client device 102 was recently connected, may evaluate various conditions related to the probe request message from client device 102. As described below in connection with FIGS. 3-5, the node device 122 may evaluate the signal strength, the frequency band capabilities of the client device 102, the frequency band used for the probe request, the number of recent attempts to steer the client device 102 to a target frequency band, and/or any other relevant properties of the client device 102 and/or probe request.

As shown by operation 146, the node device 122 may transmit a probe response message to client device 102 in response to the probe request message shown in operation 142. The node device 122 may transmit a fourth signal representing the probe response message. In various examples, the fourth signal may be transmitted using the first frequency band or the second frequency band based on whether band steering is enabled. The probe response message may be transmitted as described previously in connection with operation 134. Additionally or alternatively, the probe response message may be based at least in part on determining whether the client device 102 was recently connected to the network. The probe response message may further be based on any other conditions discussed previously in connection with operation 144. For example, the probe response message may disable a band steering process which attempts to steer client device 102 to a desired frequency band. The node device 122 may disable the band steering process based on determining that the client device 102 was recently connected to node device 112, which may improve the roaming user experience for a user of client device 102, eliminating an interruption of service during the band steering procedure. If the node device 122 determines that the client device 102 was not recently connected to node device 112 (or any other wireless network nodes of the wireless network), the node device 122 may attempt to steer client device 102 to a desired frequency band during the probe and authentication sequence.

Figure 2:
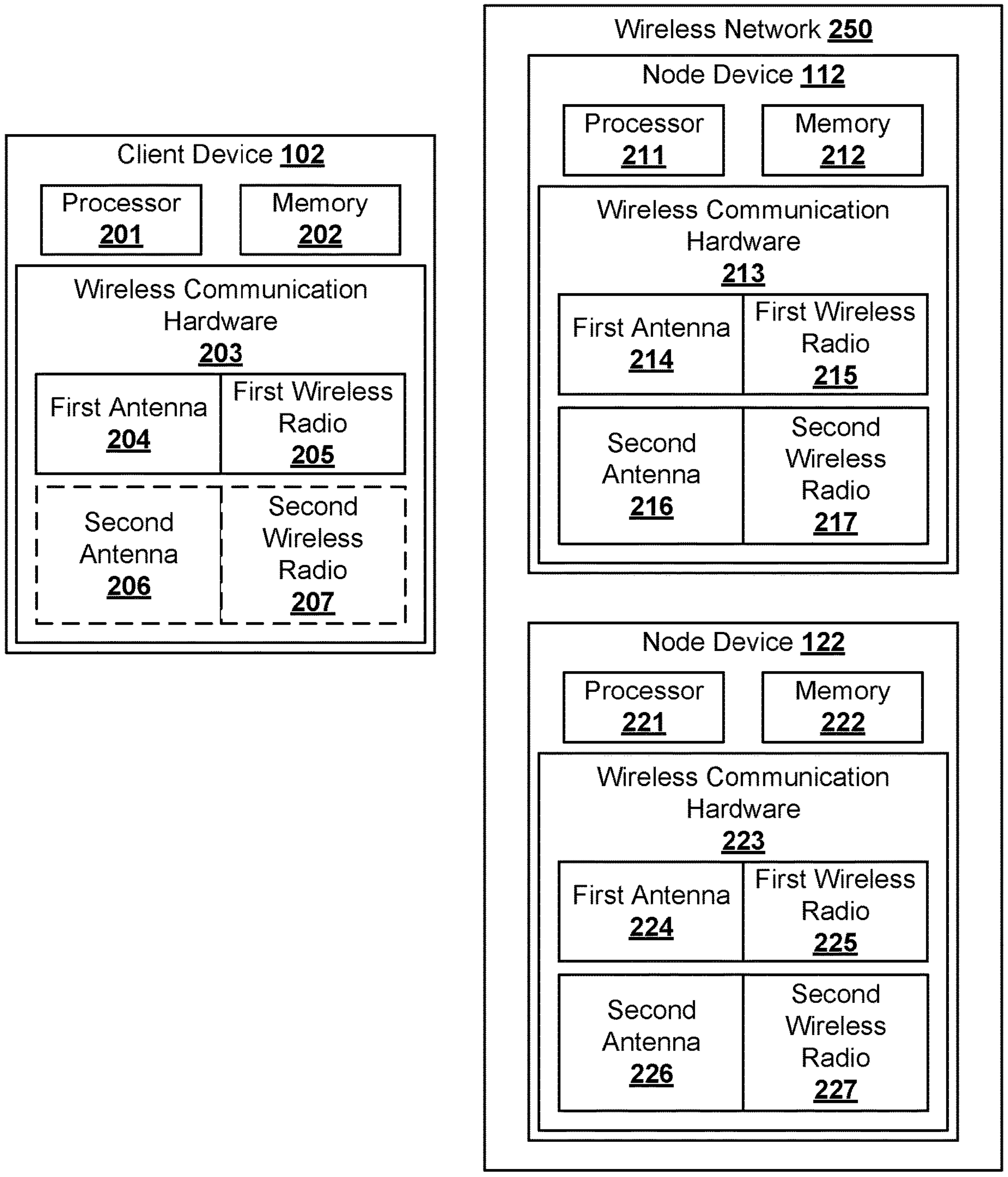
FIG. 2 depicts several example apparatuses embodying an example system for dynamic band steering for wireless mesh networks, in accordance with various aspects of the present disclosure.

FIG. 2 depicts several example apparatuses embodying a system 100 for dynamic band steering for wireless mesh networks, which may embody various example devices for performing example methods in accordance with various aspects of the present disclosure. For example, a client device 102, described previously in connection with FIG. 1, may connect to wireless network 250, comprising node device 112 and node device 122. The client device 102 may be embodied by an apparatus comprising at least one processor 201, memory 202, and wireless communication hardware 203. The wireless network 150 may be a mesh network comprising multiple access points, which may in turn be embodied by node device 112 and node device 122. Node device 112 may be embodied by an apparatus comprising at least one processor 211, memory 212, and wireless communication hardware 213. Node device 122 may similarly be embodied by an apparatus comprising at least one processor 221, memory 222, and wireless communication hardware 223. An apparatus depicted in FIG. 2 may include other circuitry and/or hardware not specifically described in connection with FIG. 2 (e.g., additional specialized circuitry, peripherals, and may be embodied by any computing device known in the art.

The processor 201, processor 211, and/or processor 221 may be connected with the memory 202 (or memory 212, memory 222), wireless communication hardware 203 (and/or wireless communication hardware 213, wireless communication hardware 223), and/or any other attached circuitry of the apparatus via a bus for passing information. In some examples, processor 201, processor 211, and/or processor 221 may include one or more hardware processors configured in tandem via a bus. The term "processor" as used herein may be understood to include a single core processor, a multi-core processor, multiple processors of the apparatus, remote or "cloud" processors, or any combination thereof.

Memory 202, memory 212, and/or memory 222 are non-transitory and may include one or more volatile and/or non-volatile memories. For example, memory 202 (and/or memory 212, memory 222) may be random access memory, a hard disk, or any other electronic storage device (e.g., a computer readable storage medium). The memory 202 (and/or memory 212, memory 222) may be configured to store information, data, content, applications, software instructions, or the like, for enabling the apparatus to carry out various functions in accordance with various examples disclosed herein.

The wireless communication hardware 203, wireless communication hardware 213, and/or wireless communication hardware 223 may be devices or circuitries embodied in either hardware or a combination of hardware, firmware, and software that is configured to receive and/or transmit data from or to a network and/or any other device wirelessly. Wireless communication hardware 203 (and/or wireless communication hardware 213, wireless communication hardware 223) may include a network interface and associated devices for communications with a wireless network, such as network interface cards, antennas, buses, switches, routers, modems, supporting hardware, and/or supporting software. The wireless communication hardware 203 (and/or wireless communication hardware 213, wireless communication hardware 223) may further include processing circuitry for causing transmission or handling receipt of signals to or from a network.

The wireless communication hardware 203, wireless communication hardware 213, and/or wireless communication hardware 223 may include on or more radios coupled to antennae for broadcasting and receiving wireless signals. An antenna may be sized and dimensioned to transmit and/or receive signals on a specified wireless signal band comprising a range of wireless signal frequencies. As shown by FIG. 2, wireless communication hardware 203 of client device 102 may include a first antenna 204 coupled to a first wireless radio 205 and optionally, a second antenna 206 coupled to a second wireless radio 207. Wireless communication hardware 213 of node device 112 may include a first antenna 214 coupled to a first wireless radio 215 and a second antenna 216 coupled to a second wireless radio 217. Wireless communication hardware 223 of node device 122 may include a first antenna 224 coupled to a first wireless radio 225 and a second antenna 226 coupled to a second wireless radio 227.

As noted previously in connection with operation 146, node device 122 may transmit a fourth signal representing a probe response message. The fourth signal may be transmitted using the first wireless radio 225 and first antenna 224 or using the second wireless radio 227 and second antenna 226 based on a determination of whether the client device 102 was recently connected to the network.

For example, the first antenna 224 may be configured to transmit and/or receive signals using a 2.4 GHz frequency band, and the second antenna 226 may be configured to transmit and/or receive signals using a 5 GHz frequency band. In some instances, client device 102 may transmit the third signal (described previously in connection with operation 142) using the first antenna 204 and first wireless radio 205, while the wireless network 250 may be configured to steer clients away from the 2.4 GHz frequency band used by the first antenna 204. If the node device 122 determines that the client device 102 was recently connected to the wireless network 250, node device 122 may disable band steering and transmit the fourth signal representing the probe response using the first antenna 224. If the node device 122 does not determine that the client device 102 was recently connected to the wireless network 250 and is configured to use band steering, node device 122 may transmit the fourth signal representing the probe response using the second antenna 226 (e.g., a 5 GHz frequency band) to steer the client to the desired frequency band.

In addition to wireless communication hardware 203 (and/or wireless communication hardware 213, wireless communication hardware 223), an apparatus may further be configured to provide an input/output interface and receive an indication of user input. For example, an apparatus may comprise a display, keyboard, mouse, touch screen, microphone, speaker, and/or other input/output devices. The apparatus may further comprise software enabling a user to interact with the apparatus, including, for example, drivers, graphical user interfaces, web browsers, terminals, and/or the like.

Figure 3:
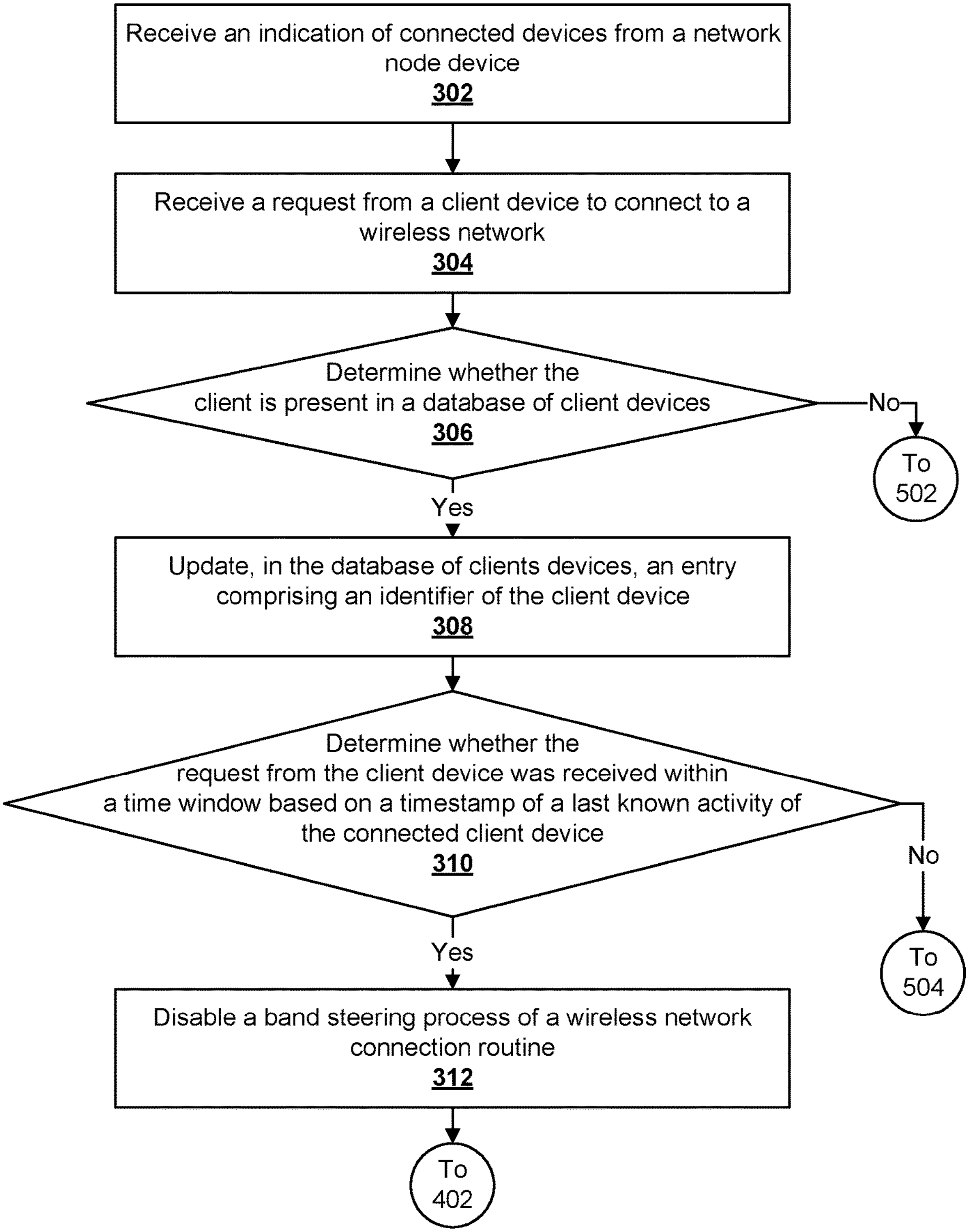
FIG. 3 depicts a block diagram illustrating an example process for dynamic band steering for wireless mesh networks, in accordance with various aspects of the present disclosure.

FIG. 3 depicts block diagrams illustrating an example process for dynamic band steering for wireless mesh networks, in accordance with various aspects of the present disclosure. Example flowcharts are illustrated that contain example operations implemented by various examples described herein. The operations illustrated in FIG. 3 may, for example, be performed by a system 100 embodied by wireless network hardware such as node device 112 and/or node device 122 in connection with client device 102 capable of wireless communication.

As shown by operation 302, a node device 112 of system 100 may include means, such as wireless communication hardware 213 and/or the like, for receiving a database of client devices from a network node device (e.g., from node device 122) of wireless network 150. In various examples, node device 112 may receive the database of client devices (or list of client devices, or "network_client" database). The database may further comprise information such as a unique identifier for each known client device, properties of various connections with the client devices, timestamps of the database and/or list entries, current connection status, and/or the like.

As shown by operation 304, a node device 112 of system 100 may include means, such as wireless communication hardware 213 and/or the like, for receiving a request from a client device 102 to connect to a wireless network 150. In various examples, a network node may receive a probe or authentication request associated with a frequency band (e.g., on either first antenna 214 or second antenna 216). The request may further comprise information such as a unique identifier for the client device, a received signal strength indicator (RSSI) value, a timestamp, and/or the like.

As shown by decision block 306, node device 112 of system 100 includes means, such as processor 211, memory 212, and/or the like, for determining whether the client device is present in a database of client devices. Various example systems may identify the client device 102 based on the request from the client device described in connection with operation 304. The database of client devices may be embodied by the network-client database described previously, which may be stored locally in memory 212. Each access point or node in a mesh network may curate its own database of client devices and may synchronize its database with the other nodes of the mesh network (e.g., node device 122 storing the database in memory 222). In some embodiments, the database of client devices may be hosted by a network-accessible storage accessible to all of the different access points or nodes in the network. Regardless of the implementation, if the client device is present in the database of client devices, various example methods may proceed to operation 308. Alternatively, example methods may proceed to operation 502 of FIG. 5. If client device 102 is not present in the database of client devices, however, the system 100 may infer that the client device is a new client device connecting for the first time.

As shown by operation 308, node device 112 of system 100 may include means, such as processor 211, memory 212, wireless communication hardware 213, and/or the like, for updating, in the database of client devices, an entry comprising a unique identifier of the client device. In various examples, the update may be performed only for new clients, and no update may be performed in an instance in which a probe or authorization request does not result in a new connection or change of status. For example, the database of client devices may update an entry with the new BSSID of the new node if a client device reconnects from one node (e.g., node device 112) to another (e.g., node device 122). In various examples, there will only be one entry for a client device at a time in the database, as old entries may be deleted every time a new entry is added. Any entries that are considered disconnected (e.g., connection status: 0) may be considered as expired after a short time delay (e.g., five seconds) and these client devices may be treated as new client devices when reconnecting after this time period.

As shown by decision block 310, node device 112 of system 100 includes means, such as processor 211, memory 212, wireless communication hardware 213, and/or the like, for determining whether the request from the client device 102 was received within a pre-determined window of time, wherein the window of time is based on a timestamp of a last known activity of client device 102. For example, node device 112 may determine that client device 102 is reconnecting after a short delay (e.g., five seconds) by determining that the request was received more than five seconds after the last known activity of the same client device 102 on the same node device 112. In another example, node device 112 may determine that client device 102 is roaming by determining that client device 102 has been connected within a short delay (e.g., five seconds) by determining that the request was received within a five second time window starting from the last known activity of the same client device 102 on a different node (e.g., node device 122).

In an instance in which the request from client device 102 was received within a pre-determined window of time calculated from a timestamp of a last known activity of the client device, the example method may proceed to operation 312. In an instance in which the request from client device 102 was not received within the pre-determined window of time calculated from a timestamp of a last known activity of the client device 102, the example method may proceed to operation 504 of FIG. 5.

In various examples, client device 102 may not be steered if it exhausts a maximum steer limit and/or the client device was recently steered within a short time window. System 100 may ignore a small number of (e.g., a total of 4) probe or authentication requests on the non-preferred band (e.g., 2.4 GHz) so that the client device will be inclined to connect to the preferred band (e.g., 5 GHz). A client device 102 that is persistent through the small number of requests and is steered a small number of times (e.g., four) within a time limit (e.g., 20 seconds) may be allowed to connect to a non-preferred band (e.g., 2.4 GHz). Table 1 illustrates an example log for an instance in which client device 102 is not steered if it exhausts a maximum steer limit or is recently steered.

TABLE 1

| Do not steer a client device if it exhausted the maximum steer limit (4) or it recently steered (within 20 seconds) |
|---|
| daemon.notice hostapd[1687]: ap_tt0: AP-STA-STEERING dc:a9:04:7f:0f:4f -48 steer_delta_ms:135983 count: 1 |
| daemon.notice hostapd[1687]: ap_tt0: AP-STA-STEERING dc:a9:04:7f:0f:4f -49 steer_delta_ms:3 count:1 |
| daemon.notice hostapd[1687]: ap_tt1: AP-STA-NO-STEERING dc:a9:04:7f:0f:4f target-interface -56 |
| daemon.notice hostapd[1687]: ap_tt0: AP-STA-STEERING dc:a9:04:7f:0f:4f -47 steer_delta_ms:16341 count:2 |
| daemon.notice hostapd[1687]: ap_tt0: AP-STA-STEERING dc:a9:04:7f:0f:4f -47 steer_delta_ms:3 count:2 |
| daemon.notice hostapd[1687]: ap_tt1: AP-STA-NO-STEERING dc:a9:04:7f:0f:4f target-interface -56 |
| daemon.notice hostapd[1687]: ap_tt0: AP-STA-STEERING dc:a9:04:7f:0f:4f -48 steer_delta_ms:4342 count:3 |
| daemon.notice hostapd[1687]: ap_tt0: AP-STA-STEERING dc:a9:04:7f:0f:4f -48 steer_delta_ms:14 count:3 |
| daemon.notice hostapd[1687]: ap_tt1: AP-STA-NO-STEERING dc:a9:04:7f:0f:4f target-interface -56 |
| daemon.notice hostapd[1687]: ap_tt0: AP-STA-STEERING dc:a9:04:7f:0f:4f -48 steer_delta_ms:3579 count:4 |
| daemon.notice hostapd[1687]: ap_tt0: AP-STA-NO-STEERING dc:a9:04:7f:0f:4f recently-steered -48 steer_delta_ms:22 count= |
| daemon.info hostapd[1687]: 1685056459.519 ap_tt1: STA dc:a9:04:7f:0f:4f IEEE 802.11: mgmt frame subtype WLAN_FC_STYPE_ |
| daemon.notice hostapd[1687]: ap_tt1: AP-STA-NO-STEERING dc:a9:04:7f: 0f:4f target-interface -59 |
| daemon.info hostapd[1687]: 1685056459.527 ap_tt1: STA dc:a9:04:7f:0f:4f IEEE 802.11: authenticated |
| daemon.info hostapd[1687]: 1685056459.528 ap_tt1: STA dc:a9:04:7f:0f:4f IEEE 802.11: mgmt frame subtype WLAN_FC_STYPE_ |
| daemon.info hostapd[1687]: 1685056459.536 ap_tt1: STA dc:a9:04:7f:0f:4f IEEE 802.11: associated (aid 1) |

As shown by operation 312, node device 112 of system 100 includes means, such as processor 211, memory 212, wireless communication hardware 213, and/or the like, for disabling a band steering process for the request to connect to the wireless network. The band steering process may be disabled, generally, if client device 102 is inferred to be roaming or quickly re-connecting. If node device 112 receives probe or authentication requests from client device 102 that is roaming from node device 122 or another band, the node device 112 may not steer client device 102 and may instead let it associate to the requested band. When band steering is disabled, the node device 112 may utilize an antenna of wireless communication hardware 213 dimensioned to transmit and receive signals using the same frequency band as the probe request received from the client device 102. Table 2 illustrates an example log for an instance in which client device 102 is determined to be roaming, and is not steered.

TABLE 2

| Do not steer if a client device is roaming or quickly re-connecting |
| --- |
| daemon.notice hostapd[1697]: ap_tt0: AP-STA-NO-STEERING 5a:11:04:2d:a2:67 is roaming from other node |
| daemon.info hostapd[1697]: 1700008071.588 ap_tt0: STA 5a:11:04:2d:a2:67 IEEE 802.11: authenticated |
| daemon.info hostapd[1697]: 1700008071.596 ap_tt0: STA 5a:11:04:2d:a2:67 IEEE 802.11: mgmt frame subtype |
| daemon.info hostapd[1697]: 1700008071.602 ap_tt0: STA 5a:11:04:2d:a2:67 IEEE 802.11: associated (aid 1 |
| daemon.info hostapd[1697]: 1700008071.603 ap_tt0: STA 5a:11:04:2d:a2:67 WPA: sending 1/4 msg of 4-Way Handshake |
| daemon.info hostapd[1697]: 1700008071.608 ap_tt0: STA 5a:11:04:2d:a2:67 WPA: received 2/4 msg of 4-Way Handshake |
| daemon.info hostapd[1697]: 1700008071.608 ap_tt0: STA 5a:11:04:2d:a2:67 WPA: sending 3/4 msg of 4-Way Handshake |
| daemon.info hostapd[1697]: 1700008071.636 ap_tt0: STA 5a:11:04:2d:a2:67 WPA: received 4/4 msg of 4-Way Handshake |
| daemon.info hostapd[1697]: 1700008071.686 ap_tt0: STA 5a:11:04:2d:a2:67 IEEE 802.11: Connected |
| daemon.notice hostapd[1697]: ap_tt0: AP-STA-CONNECTED flags=00008aa3 5a:11:04:2d:a2:67 |
| user.info client-reporter[721]: level=info msg="wireless device 5a:11:04:2d:a2:67 connected to ap_tt0" |
| daemon.info hostapd[1697]: 1700008071.686 ap_tt0: STA 5a:11:04:2d:a2:67 WPA: pairwise key handshake completed |
| daemon.notice hostapd[1697]: ap_tt0: EAPOL-4WAY-HS-COMPLETED 5a:11:04:2d:a2:67 |

Figure 4:
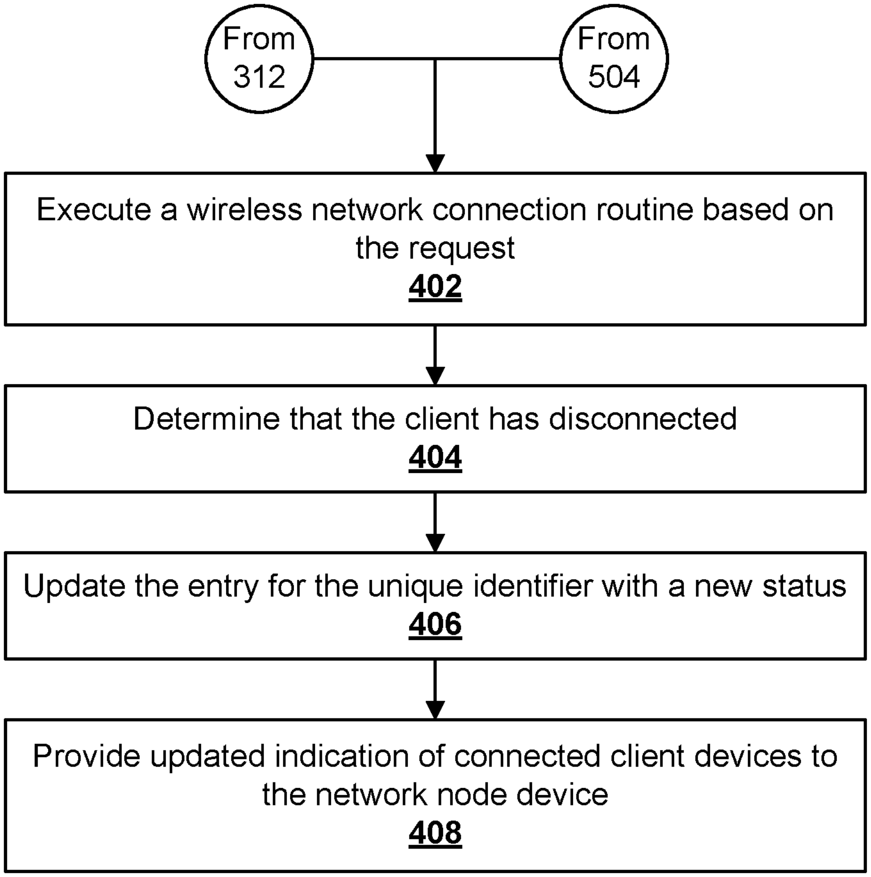
FIG. 4 depicts an additional block diagram illustrating an example process for dynamic band steering for wireless mesh networks, in accordance with various aspects of the present disclosure.

Turning next to FIG. 4, as shown by operation 402, node device 112 of system 100 includes means, such as processor 211, memory 212, wireless communication hardware 213, and/or the like, for executing a wireless network connection routine based on the request. The request may be executed with band steering enabled or disabled based on the previous determinations performed in operation 302 through operation 310. The appropriate antenna of wireless communication hardware 213 may be chosen according to the decision to enable or disable band steering, and the frequency band used for the client probe request.

As shown by operation 404, node device 112 of system 100 may include means, such as processor 211, memory 212, wireless communication hardware 213, and/or the like, for determining that the client device has disconnected. Node device 112 may optionally determine that client device 102 has disconnected by inferring based on a timeout, or by receiving an instruction to disconnect, for example.

As shown by operation 406, node device 112 of system 100 may include means, such as processor 211, memory 212, wireless communication hardware 213, and/or the like, for updating the entry for the unique identifier with a new status (e.g., status: 0). In various examples, the entry with the disconnected status may be deleted when a new entry is added (e.g., if the client device reconnects at a later time). In various examples, an entry with a disconnected status (e.g., status: 0) may be considered as expired after a short delay (e.g., five seconds).

As shown by operation 408, node device 112 of system 100 may include means, such as wireless communication hardware 213, and/or the like, for providing the database of client devices to a network node device (e.g., node device 122). Upon updating the database of client devices (e.g., "network_client" database), node devices of wireless network 250 may update and provide the updated database to other network nodes, and may thereby distribute updates across the wireless mesh network.

Figure 5:
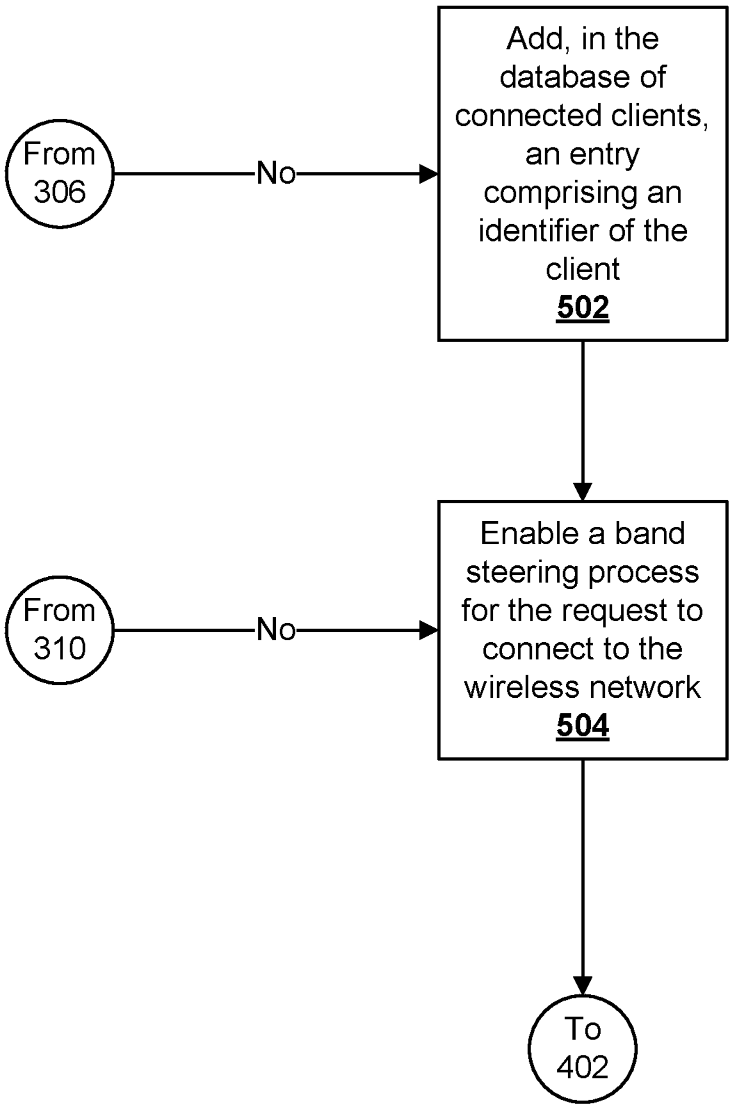
FIG. 5 depicts an additional block diagram illustrating an example process for dynamic band steering for wireless mesh networks, in accordance with various aspects of the present disclosure.

Turning now to FIG. 5, as shown by operation 502, node device 112 of system 100 may include means, such as processor 211, memory 212, wireless communication hardware 213, and/or the like, for adding, in the database of client devices, an entry comprising a unique identifier of the client device. If client device 102 connects to the network, the database of client devices (e.g., "network_client" database) may add an entry of the client device's MAC address, BSSID of the node it is connected to, the client device's connection status (e.g., 1: connected), and the update time. A command (e.g., SHOW_NETWORK_CLIENT) may be used to see the current list of client devices.

As shown by operation 504, node device 112 of system 100 include means, such as processor 211, memory 212, wireless communication hardware 213, and/or the like, for enabling a band steering process for the request to connect to the wireless network 150. Node device 112 may enable the band steering process, in general, for new client devices that are inferred to have the capability to connect at the desired band.

For new client devices, example systems may attempt to use band steering to steer the client device to a preferred frequency band. Table 3 shows an example log for a client device successfully steering from a 2.4 GHz band to a 5 GHz band.

TABLE 3

| Successful band steering from 2.4 GHz to 5 GHz |
| --- |
| daemon.notice hostapd[1687]: ap_tt0: AP-STA-STEERING dc:a9:04:7f:0f:4f -53 steer_delta_ms:783098 count: 1 |
| daemon.notice hostapd[1687]: ap_tt0: AP-STA-STEERING dc:a9:04:7f:0f:4f -53 steer_delta_ms:12 count: 1 |
| daemon.notice hostapd[1687]: ap_tt1: AP-STA-NO-STEERING dc:a9:04:7f:0f:4f target-interface -52 |
| daemon.notice hostapd[1687]: ap_tt1: AP-STA-NO-STEERING dc:a9:04:7f:0f:4f target-interface -53 |
| daemon.notice hostapd[1687]: ap_tt0: AP-STA-STEERING dc:a9:04:7f:0f:4f -53 steer_delta_ms:4451 count:2 |
| daemon.notice hostapd[1687]: ap_tt0: AP-STA-STEERING dc:a9:04:7f:0f:4f -53 steer_delta_ms:11 count:2 |
| daemon.info hostapd[1687]: 1684880048.994 ap_tt1: STA dc:a9:04:7f:0f:4f IEEE 802.11: mgmt frame subtype WLAN_FC_STYPE |
| daemon.notice hostapd[1687]: ap_tt1: AP-STA-NO-STEERING dc:a9:04:7f:0f:4f target-interface -55 |
| daemon.info hostapd[1687]: 1684880049.009 ap_tt1: STA dc:a9:04:7f:0f:4f IEEE 802.11: authenticated |
| daemon.info hostapd[1687]: 1684880049.010 ap_tt1: STA dc:a9:04:7f:0f:4f IEEE 802.11: mgmt frame subtype WLAN_FC_STYPE_ |
| daemon.info hostapd[1687]: 1684880049.016 ap_tt1: STA dc:a9:04:7f:0f:4f IEEE 802.11: associated (aid 1) |

A new client device attempting to connect to a preferred frequency band may not need steering. Table 4 shows an example log in which the request to connect to the wireless network is received only via the preferred frequency band.

TABLE 4

| Do not steer from the target interface |
| --- |
| daemon.info hostapd[2157]: 1684526604.949 ap_tt1: STA 9a:79:ae:dc:b0:dd IEEE 802.11: mgmt frame subtype WLAN_FC_STYPE |
| daemon.notice hostapd[2157]: ap_tt1: AP-STA-NO-STEERING 9a:79:ae:dc:b0:dd target-interface -41 |
| daemon.info hostapd[2157]: 1684526604.965 ap_tt1: STA 9a:79:ae:dc:b0:dd IEEE 802.11: authenticated |
| daemon.info hostapd[2157]: 1684526604.966 ap_tt1: STA 9a:79:ae:dc:b0:dd IEEE 802.11: mgmt frame subtype WLAN_FC_STYPE |
| daemon.info hostapd[2157]: 1684526604.974 ap_tt1: STA 9a:79:ae:dc:b0:dd IEEE 802.11: associated (aid 1) |

In various examples, steering may also be disable for client devices that only attempt to connect via the non-preferred frequency band. Such client devices (non-candidate clients) may not have the capability to connect via the preferred frequency band, and may not benefit from steering. Table 5 shows an example log in which the request to connect to the wireless network is received only via the non-preferred frequency band.

TABLE 5

| Do not steer a non-candidate client |
| --- |
| daemon.notice hostapd[2164]: ap_tt0: AP-STA-NO-STEERING 94:eb:cd:3b:59:03 non-candidate -45 steer_delta_ms:0 count:0 |
| daemon.info hostapd[2164]: 1685059543.788 ap_tt0: STA 94:eb:cd:3b:59:03 IEEE 802.11: mgmt frame subtype WLAN_FC_STYPE |
| daemon.notice hostapd[2164]: ap_tt0: AP-STA-NO-STEERING 94:eb:cd:3b:59:03 non-candidate -47 steer_delta_ms:0 count:0 |
| daemon.info hostapd[2164]: 1685059543.801 ap_tt0: STA 94:eb:cd:3b:59:03 IEEE 802.11: authenticated |
| daemon.info hostapd[2164]: 1685059543.803 ap_tt0: STA 94:eb:cd:3b:59:03 IEEE 802.11: mgmt frame subtype WLAN_FC_STYPE_ |
| daemon.info hostapd[2164]: 1685059543.811 ap_tt0: STA 94:eb:cd:3b:59:03 IEEE 802.11: associated (aid 1) |

In various examples, client devices with weak signal strength may not be steered, regardless of whether the client device is found in the database of client devices or not. Table 6 shows an example log in which the request to connect to the wireless network is received with low signal strength.

TABLE 6

| Do not steer if signal strength is weak |
| --- |
| daemon.notice hostapd[1759]: ap_tt1: AP-STA-NO-STEERING f8:1a:2b:57:d6:56 weak-signal 68 |
| daemon.notice hostapd[1759]: ap_tt1: AP-STA-NO-STEERING f8:1a:2b:57:d6:56 weak-signal 67 |

As an extended example, the following sequence of events may take place when a band steering event occurs for band steering from 2.4 GHz to a 5 GHz band. First, client device 102 sends a probe or authentication request on both 2.4 GHz and 5 GHz bands. Next, node device 112 takes one or more of the following actions before responding to the probe/authentication request, including: (a) applying call band steering logic only for broadcast probes, (b) registering probes only if RSSI is at least-70 dBm, (c) making a determination not to steer the probing client device if it is already probing on target interface, (d) making a determination not to steer if the client device has not probed on the target interface (consider them as non-candidate), (e) making a determination not to steer if RSSI<−60 dBm and the client device has not probed on the target interface in the last 15 seconds (f) making a determination not to steer if the client device is roaming (both intra-node and inter-node), (g) making a determination not to steer if the client device is re-connecting within 5 seconds, (h) if all the above steps are not taken, steering the client device at most 4 times, (i) ignoring consecutive probes within 25 ms, and (j) after the steer count reaches 4, making a determination not to steer the client device for 20 seconds. Following this sequence of actions, the node may send a probe or authentication response to the client device for the target interface. If the client device is persistent in connecting to 2.4 GHz and has been steered 4 times within 20 seconds, the node responds with a probe/authentication reply for 2.4 GHz. It will be understood that the particular numerical values and conditions enumerated above are presented in connection with one illustrative example, and various examples may use different configurable values and conditions.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An electronic device comprising:

a first antenna sized and dimensioned to transmit signals in a first frequency band;

a first wireless radio coupled to the first antenna;

a second antenna sized and dimensioned to transmit signals in a second frequency band;

a second wireless radio coupled to the second antenna;

one or more processors; and one or more computer readable media storing processor executable instructions which, when executed using the one or more processors, cause the electronic device to perform operations comprising:

transmitting, using the first radio and the first antenna, a first signal representing a beacon message for the first frequency band for a wireless mesh network, transmitting, using the second radio and the second antenna, a second signal representing a beacon message for the second frequency band for the wireless mesh network, receiving first data sent by a second electronic device, the first data indicating an identifier of a third electronic device connected to the wireless mesh network via the second electronic device, based on the receiving of the first data:

updating a stored list of device connections for the wireless mesh network, receiving, using the first radio and the first antenna, a third signal representing a probe request message transmitted by the third electronic device, the probe request message including the identifier of the third electronic device, based on the receiving of the probe request message:

determining that the third electronic device was recently connected to the wireless mesh network based on the identifier of the third electronic device and the stored list of device connections, and based on the determining that the third electronic device was recently connected to the wireless mesh network, transmitting a fourth signal representing a probe response message.

2. The electronic device of claim 1, wherein the determining that the third electronic device was recently connected to the wireless mesh network comprises determining that the request from the third electronic device was received within a pre-determined amount of time from a last known device connection of the third electronic device.

3. The electronic device of claim 1, wherein the determining that the third electronic device was recently connected to the wireless mesh network comprises determining that the request from the third electronic device was received within a configured amount of time from a last known device connection of the third electronic device.

4. The electronic device of claim 1, wherein the first frequency band comprises a 2.4 GHz frequency band.

5. The electronic device of claim 1, wherein the second frequency band comprises a 5 GHz frequency band.

6. The electronic device of claim 1, wherein the second frequency band comprises a 6 GHz frequency band.

7. The electronic device of claim 1, wherein the beacon message for the first frequency band for the wireless mesh network is a beacon frame in accordance with an IEEE 802.11 protocol.

8. The electronic device of claim 1, wherein the one or more computer readable media store processor executable instructions which, when executed using the one or more processors, cause the electronic device to perform operations comprising:

determining, based on the stored list of device connections, a first timestamp corresponding to activity of the third electronic device;

wherein the determining that the third electronic device was recently connected to the wireless mesh network is based on the first timestamp.

9. The electronic device of claim 1, wherein the stored list of device connections includes a first entry corresponding to a fourth electronic device that has been disconnected, and wherein the one or more computer readable media store processor executable instructions which, when executed using the one or more processors, cause the electronic device to perform operations comprising:

removing, from the stored list of device connections, the first entry based on a determination that a configured amount of time has elapsed since the fourth electronic device was disconnected.

10. An electronic device comprising:

a first antenna sized and dimensioned to transmit signals in a first frequency band;

a first wireless radio coupled to the first antenna;

a second antenna sized and dimensioned to transmit signals in a second frequency band;

a second wireless radio coupled to the second antenna;

one or more processors; and one or more computer readable media storing processor executable instructions which, when executed using the one or more processors, cause the electronic device to perform operations comprising:

transmitting, using the first radio and the first antenna, a first signal representing a beacon message for the first frequency band for a wireless mesh network, transmitting, using the second radio and the second antenna, a second signal representing a beacon message for the second frequency band for the wireless mesh network, receiving first data sent by a second electronic device, the first data indicating an identifier of a third electronic device connected to the wireless mesh network via the second electronic device, based on the receiving of the first data, updating a stored list of device connections for the wireless mesh network, receiving, using the first radio and the first antenna, a third signal representing a probe request message transmitted by the third electronic device, the probe request message including the identifier of the third electronic device, based on the receiving of the probe request message, determining a timestamp of a connection of the third electronic device to the wireless mesh network based on the identifier of the third electronic device and the stored list of device connections, and based on the determining of the timestamp, transmitting a fourth signal representing a probe response message.

11. The electronic device of claim 10, wherein the one or more computer readable media store processor executable instructions which, when executed using the one or more processors, cause the electronic device to perform operations comprising:

updating, in a database of client devices, an entry comprising the identifier of the third electronic device.

12. The electronic device of claim 10, wherein the one or more computer readable media store processor executable instructions which, when executed using the one or more processors, cause the electronic device to perform operations comprising:

determining that the third electronic device has disconnected from the wireless mesh network; and upon determining that the third electronic device has disconnected from the wireless mesh network, updating an entry in a database of client devices with a new status, wherein the entry comprises the identifier of the third electronic device.

13. The electronic device of claim 10, wherein the one or more computer readable media store processor executable instructions which, when executed using the one or more processors, cause the electronic device to perform operations comprising:

updating a database of client devices based on the identifier to produce an updated database of client devices; and transmitting a fifth signal representing an update to the database of client devices to the second electronic device.

14. The electronic device of claim 10, wherein the one or more computer readable media store processor executable instructions which, when executed using the one or more processors, cause the electronic device to perform operations comprising:

determining that the request from the third electronic device was received within a pre-determined window of time, wherein the window of time is based on the timestamp, wherein the fourth signal is transmitted using the first antenna and the first wireless radio.

15. The electronic device of claim 10, wherein the one or more computer readable media store processor executable instructions which, when executed using the one or more processors, cause the electronic device to perform operations comprising:

determining that the request from the third electronic device was not received within a pre-determined window of time, wherein the window of time is based on the timestamp, wherein the fourth signal is transmitted using the second antenna and the second wireless radio.

16. The electronic device of claim 10, wherein the one or more computer readable media store processor executable instructions which, when executed using the one or more processors, cause the electronic device to perform operations comprising:

executing a wireless network connection routine based on the probe request message.

17. The electronic device of claim 10, wherein the one or more computer readable media store processor executable instructions which, when executed using the one or more processors, cause the electronic device to perform operations comprising:

determining that the request from the third electronic device was received within a configured window of time, wherein the window of time is based on the timestamp, wherein the fourth signal is transmitted using the first antenna and the first wireless radio.

18. A method comprising:

transmitting, using a first wireless radio and a first antenna, a first signal representing a beacon message for a first frequency band for a wireless mesh network;

transmitting, using a second wireless radio and a second antenna, a second signal representing a beacon message for a second frequency band for the wireless mesh network;

receiving first data sent by a second electronic device, the first data indicating an identifier of a third electronic device connected to the wireless mesh network via the second electronic device;

based on the receiving of the first data:

updating a stored list of device connections for the wireless mesh network, and receiving, using the first wireless radio and the first antenna, a third signal representing a probe request message transmitted by the third electronic device, the probe request message including the identifier of the third electronic device;

based on the receiving of the probe request message:

determining that the third electronic device was recently connected to the wireless mesh network based on the identifier of the third electronic device and the stored list of device connections; and based on the determining that the third electronic device was recently connected to the wireless mesh network, transmitting a fourth signal representing a probe response message.

19. The method of claim 18, wherein the determining that the third electronic device was recently connected to the wireless mesh network comprises determining that the request from the third electronic device was received within a pre-determined amount of time from a last known device connection of the third electronic device.

20. The method of claim 18, wherein the determining that the third electronic device was recently connected to the wireless mesh network comprises determining that the request from the third electronic device was received within a configured amount of time from a last known device connection of the third electronic device.

* * * * *